Jan. 3, 1967    O. VIELMO ETAL    3,295,419
VEHICLE BRAKING INSTALLATION
Filed Sept. 21, 1964    2 Sheets-Sheet 1

INVENTORS
Oskar Vielmo
Reinhold Scholl
by Michael J. Striker

Jan. 3, 1967   O. VIELMO ETAL   3,295,419
VEHICLE BRAKING INSTALLATION
Filed Sept. 21, 1964   2 Sheets-Sheet 2

FIG.2

INVENTORS
Oskar Vielmo
Reinhold Scholl by Michael J. Striker

United States Patent Office 3,295,419
Patented Jan. 3, 1967

1

3,295,419
VEHICLE BRAKING INSTALLATION
Oskar Vielmo, Stuttgart-Sonnenberg, and Reinhold Scholl, Ditzingen, Germany, assignors to Robert Bosch G.m.b.H., Stuttgart, Germany
Filed Sept. 21, 1964, Ser. No. 397,758
25 Claims. (Cl. 91—170)

The present invention relates to brake installations.

In particular, the present invention relates to vehicle brake installations which are operated by fluid under pressure.

It is already known to provide brake installations of this latter type with spring-actuated brakes which can be used for parking and emergency purposes, for example, and also it is known to cause the spring-actuated brakes to be applied automatically when there is a given drop in the pressure of the fluid used for the fluid pressure brakes. However, installations of this latter type when they apply the spring-actuated brakes cannot be controlled by the operator and provide a very sudden application of the spring-actuated brakes without affording the operator an opportunity to maintain a considerable degree of control over the vehicle.

It is, therefore, an object of the invention to avoid the above drawbacks by providing a structure where a spring-pressure means will actuate the brake means of the vehicle when the fluid-pressure means normally used to actuate the brake means cannot continue to function properly because of a drop in pressure, for example, but where the spring-pressure brake means when it is called into play will operate in a gradual manner and will still afford the operator a considerable degree of control over the vehicle.

In particular, it is an object of the invention to provide a structure of the above type which enables the spring-pressure means to gradually apply the brakes of the vehicle to all of the wheels thereof if there is a drop in the fluid pressure below a given value.

In addition, it is an object of the invention to provide a structure of the above type which will enable the operator to continue to operate the brakes with fluid pressure at least a few times after the fluid pressure from the source of fluid drops below a given value.

Furthermore, it is an object of the invention to provide a structure of the above type which makes it possible for the operator to release the brakes after they have been actuated by the spring-pressure means when the fluid pressure has dropped below a given value.

Furthermore, it is an object of the invention to provide for a structure of the above type an exceedingly compact assembly which can conveniently be mounted in the vehicle in such a way that it can very comfortably be controlled by the operator while at the same time occupying a relatively small space.

In addition, it is an object of the invention to provide for a structure of the above type a simple valving assembly cooperating with relatively simple compact fluid-paths which enable the pressure fluid to be directed in a very effective manner for producing the desired operations.

In addition, it is an object of the invention to provide for a structure of the above type an arrangement of pressure chambers and chambers which are at atmospheric pressure which is exceedingly compact and efficient.

Still another object of the present invention is to provide a structure of the above type which will reliably prevent undesirable vibratory movement of the components when they are in a rest position with the brakes released.

Furthermore, the objects of the present invention include a structure for providing a very effective seal between a cylinder and a piston which cooperate to provide the required operations.

With the above objects in view the invention includes, in a vehicle braking installation, a fluid-pressure housing means and a spring-pressure housing means connected to the fluid-pressure housing means to form a unitary assembly therewith. A brake means is provided for braking the vehicle, and a fluid-pressure means is situated in the fluid-pressure housing means for actuating the brake means while a spring-pressure means is situated within the spring-pressure housing means also for actuating the brake means. A suitable source of fluid under pressure communicates through a conduit means with both of the above-mentioned housing means, and an operator-actuated valve means controls the flow of pressure fluid through the conduit means to the fluid-pressure housing means to actuate the fluid-pressure means therein, while a non-return valve means controls the flow of the fluid under pressure to the spring-pressure housing means. Situated within the latter is a pressure responsive means which maintains the spring-pressure means inoperative and thus ineffective to actuate the brake means until a predetermined drop in pressure causes the pressure responsive means to respond for rendering the spring-pressure means operative to actuate the brake means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
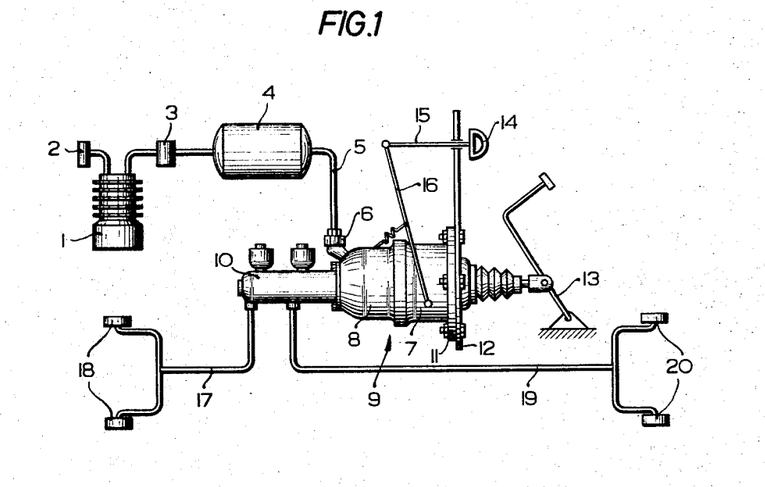
FIG. 1 is a schematic illustration of the installation of the present invention.

The vehicle-braking installation which is schematically illustrated in FIG. 1 includes an air compressor 1, driven in any suitable way from the engine of the vehicle, and with this air compressor sucks fluid through the filter 2 from the outer atmosphere and delivers this fluid under pressure through a pressure regulator 3 to a container 4 in the form of a suitable tank which forms a source for fluid under pressure which in the instant example is compressed air. A conduit 5 forms part of a conduit means of the invention and communicates with the source 4 as well as with the housing 6 of a non-return valve means so that the latter controls the flow of fluid through the conduit means 5. This housing 6 is directly fixed to and carried by the spring-pressure housing means 8 of a unitary assembly 9 which also includes a fluid-pressure housing means 7. In addition, the spring-pressure housing means 8 carries a hydraulic main cylinder 10 which controls the flow of the hydraulic braking liquid to the brakes of the vehicle. The fluid-pressure housing means 7 fixedly carries a flange 11 which by suitable bolts enables the unitary assembly 9 to be fixed to the vehicle wall 12 which is situated at the lower front part of the vehicle compartment where the vehicle operator is located, so that the wall 12 is easily accessible to the feet of the operator although the upper part of the wall 12 is also easily accessible to the hands of the operator of the vehicle. This flange 11 is required to be relatively thick inasmuch as it serves to carry not only the unitary assembly 9 but also the hydraulic brake means 10. A foot-operated lever 13 is accessible to the operator for operating the fluid-pressure means within the fluid-pressure housing 7, and a hand grip 14 is available to the operator for actuating a rod 15 to which the hand grip 14 is connected, this rod 15 being linked to a lever 16 which forms part of a structure for releasing the spring-pressure means when the latter actuates the brake means 10, as will be apparent from the description below. The brake means 10 communicates through a conduit 17 with the brakes 18 of the front wheels and through a conduit 19 with the brakes 20 of the rear wheels.

Figure 2:
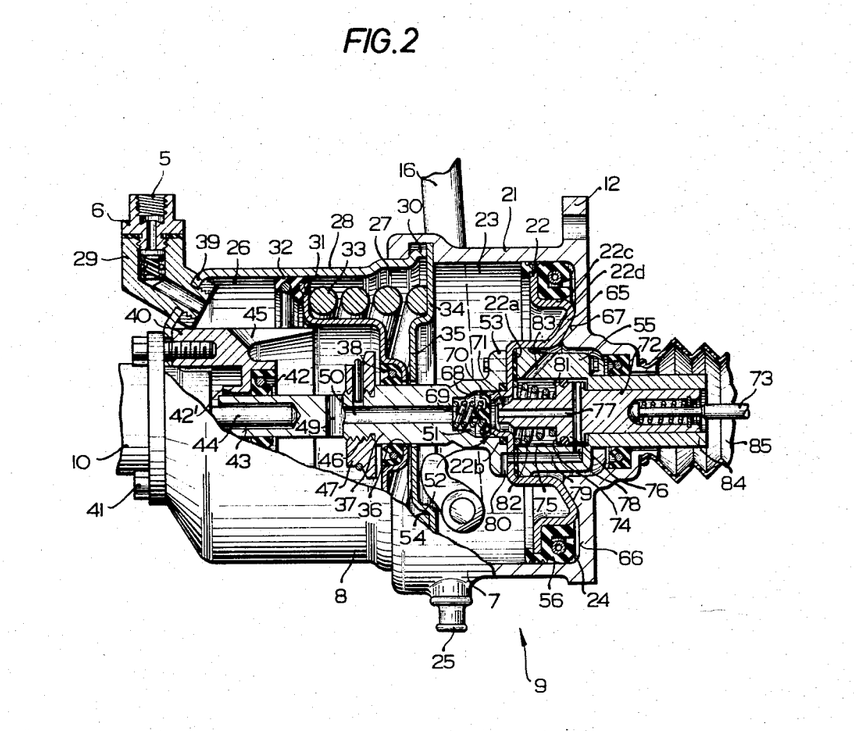
FIG. 2 is a longitudinal sectional elevation of the details of the structure of the invention.

Referring now to FIG. 2, it will be seen that the fluid-pressure housing means 7 includes a housing 21 which is in the form of a casting and which has a cylindrical configuration, the housing having a right end wall, as viewed in FIG. 2. The interior of the housing is of cylindrical cross section and slidably receives a piston means which includes a piston 22 which divides the interior of the housing 23 into a pair of chambers 23 and 24. The chamber 23 communicates through a suitable fitting 25 with the outer atmosphere so that the chamber 23 is at all times at atmospheric pressure, while the chamber 24 on the right side of the piston 22 is a pressure chamber which receives the fluid under pressure and which has its volume increased beyond the minimum volume thereof shown in FIG. 2 in a manner described below.

The spring-pressure housing means 8 and the fluid-pressure housing means 7 are coaxially arranged with the spring-pressure housing means 8 situated next to and behind the fluid-pressure housing means 7. The spring-pressure housing means 8 has in its interior a pressure chamber 26 which is of course situated at one end of the unitary assembly 9, while the pressure chamber 24 is situated at the opposite end in the fluid-pressure housing means 7. The atmospheric chamber 23 of the fluid-pressure means 7 communicates with a chamber 27 in the spring-pressure housing means 8, so that this chamber 27 is also at atmospheric pressure, and these atmospheric chambers 23 and 27 are situated next to each other intermediate the ends of unitary assembly 9 where the pressure chamber 26 and 24 are situated. The spring-pressure housing means 8 includes a housing 28 formed from a suitable sheet metal which is drawn in a suitable press so as to have the pot or cup-shaped configuration illustrated in FIG. 2. The end portion of the housing 28 which defines the part of the pressure chamber 26 carries the housing 6 of the non-return valve means referred to above. A non-return valve means 29 is situated within this housing 6, and while the non-return valve means 29 permits fluid to flow through the conduit 5 into the chamber 26, it does not permit fluid to flow in the reverse direction when the pressure in the chamber 26 exceeds the pressure in the conduit 5 and the source 4. The conduit 5 is of course fluid-tightly connected with the non-return valve means 29. The housing 28 of the spring-pressure housing means 8 has at its right end, as viewed in FIG. 2, a circular peripheral portion 30 which is directly in engagement with the housing 23 of the fluid-pressure housing means 7. For example, these housings can be connected to an unillustrated bayonet connection.

A pressure-responsive means is situated in the housing 28 in order to respond to changes in the pressure of the fluid therein, and this pressure-responsive means takes the form of a piston 31 which has axially extending cylindrical portions, as illustrated, and which carries at its outer periphery a sealing ring 32 which slidably and fluid-tightly engages the inner cylindrical surface of the housing 28. The piston 31 engages at an outer peripheral portion thereof an end of a spring-pressure means formed by a coil spring 30 which is coiled about a cylindrical portion of the piston 31 and engages the radially extending peripheral portion thereof, as indicated in FIG. 2, and this spring 33 forms the spring-pressure means which is situated within the spring-pressure housing means 8.

The spring 33, which is a fairly powerful coil spring, is guided in part by the cylindrical portion of the piston 31 which it surrounds, and the right end of the spring 33, as viewed in FIG. 2, engages a transverse wall 34 which is common to and situated between the coaxial pair of housing means 7 and 8. Thus, the pair of housing means 7 and 8 are in the form of a tubular means which between its ends carries the transverse wall 34 which divides the tubular means into the pair of housing means 7 and 8. This common wall 34 separates the atmospheric chambers 23 and 27 of the assembly 9 from each other. Moreover, the wall 34 serves as a stop for limiting the movement of the pressure-responsive means 31 to the right, as viewed in FIG. 2. In order to provide an additional guide for the spring 33, the transverse wall 34 has a circular portion 35 projecting into the right end of the spring 33, as viewed in FIG. 2, and except for its circular periphery which is surrounded by the coil spring 33 the projection 35 is flat. The projection 35 is formed centrally of the wall 34 with an opening 36, and a piston rod 37 extends with clearance through this opening 36. This piston rod 36 forms together with the piston 22 a piston means situated within the fluid-pressure housing means 7, and it will be noted that the piston rod 36 is fixed at its right end to the piston 22. The piston 37 extends not only through the wall 34 but also through a central opening formed in the piston 31, the latter carrying at its inner periphery which surrounds the piston rod 37 a sealing ring 38 which provides a fluid-tight slidable engagement between the piston rod 37 and the piston 31. The gap between the wall 34 and the piston rod 37, in the opening 36, permits air to flow with substantially no resistance between the pair of atmospheric chambers 23 and 27.

The end 39 of the housing 28 fixedly carries a cylindrical insert 40 which serves to reinforce the end 39 by stiffening the latter, and this insert 40 in addition acts as a stop for the piston 31 when the latter responds to a drop in pressure to permit the spring 33 to expand so as to apply the brake means 10. The outer diameter of the insert 40 is such that this insert 40 can be slidably received within the cylindrical portion of the piston 31 which is surrounded by the spring 33, so that the insert 40 acts also as a guide for the piston 31. This insert 40 is hollowed out at its opposed ends, and at its end which is directed toward the end 39 of the housing 28 this insert 40 is formed with threaded bores which receive the fastening screws 41 which serve to fix the insert 40 to the end 39 of the housing 28. In addition, these screws 40 pass through openings of a flange of the main hydraulic brake means 10 so that the screws 41 serve to fix the brake means 10 to the housing 28. As is particularly apparent from FIG. 2, the flange of the main brake means 10 is situated inwardly of the right end of the main brake means 10, so that the portion thereof which extends to the right beyond the flange is received within the hollowed out portion of the insert 40, so that in this way a compact unitary assembly is provided. Between its hollow end portions, the insert 40 carries a transverse web which surrounds and slidingly engages the piston rod 37 which thus extends through the transverse web of the insert 40, and the web of the insert 40 carries a sealing ring 42 which slidably engages the exterior surface of the piston rod 37 in a fluid-tight manner. The piston rod 37 is formed at its end which is directed toward the brake means 10 with an axial bore 43 which receives a plunger 44 which transmits the movement of the piston rod 37 to an unillustrated piston in the main cylinder of the brake means 10, and unillustrated springs act on this latter piston rod 37 to urge it to the right, as viewed in FIG. 2. The portion of the insert 40 which extends to the right beyond its transverse web, as viewed in FIG. 2, is formed with a plurality of cutouts 45 distributed circumferentially about the piston rod 37 and through which the compressed air can freely flow.

At its portion which is situated within the pressure chamber 26, the piston rod 37 has a threaded section 46 on which a nut 47 is threaded for the purpose of adjusting the stroke of the piston 31. An annular spring 48 serves to releasably lock the nut 47 in its adjusted position. Thus, it will be seen that as the piston 31 moves to the left from the position thereof shown in FIG. 2, this piston will necessarily engage the nut 47 so as to transmit movement of the piston 31 through the nut 47 to the piston rod 37. Just to the left of the nut 47, as viewed in FIG. 2, the piston rod 37 is formed with a transverse bore 49 which extends completely through the piston rod 37 and which communicates with an axial bore 50 formed in the piston rod 37, so that to the right of the transverse bore 49 the piston rod 37 is hollow. The axial bore 50 communicates at its right end, as viewed in FIG. 2, with a hollow end portion 51 of the piston rod 37, and this hollow end portion 51 forms a valve housing for part of an operator-actuated valve means 52. The conduit means for supplying the fluid pressure to the unitary assembly 9 includes not only the conduit 5 which supplies the fluid under pressure to the interior of the spring-pressure housing means 8 but also the hollow bores 49 and 50 of the piston rod 37, these bores 49 and 50 forming that part of the conduit means which delivers fluid under pressure to the fluid-pressure housing means 7 through the operator-actuated valve means 52 which is described in greater detail below.

In the region of the valve means 52, the piston rod 37 terminates in an outwardly directed flange 53 which forms an annular surface adapted to be engaged by the free end of a lever 54 which is situated within the atmospheric chamber 23 of the fluid-pressure housing means 7. This lever 54 is fixedly carried by a rotary shaft which extends through the wall of the housing 21 and which is supported by this wall for rotary movement, and outside of the housing 21 this rotary shaft is fixed to the lever 16, so that in response to turning of the lever 16 the lever 54 will also turn. A second valve housing 55, of cylindrical configuration, is situated at the side of the piston 22 opposite from the valve housing formed by the hollow end portion 51 of the piston rod 37. A pair of sealing rings 22a and 22b engage the opposed faces of the piston 22 and are situated between the latter and the end of the piston rod 37 and the valve housing 55, and the flange 53 is fixed by suitable screws or the like to the second valve housing 55 with the piston 22 and the sealing rings 22a and 22b clamped between the flange 53 and the valve housing 55. The piston 22 has the substantially dish-shaped configuration found in FIG. 2 and carries at its outer periphery a sealing ring 56 of a special construction.

Figure 3:
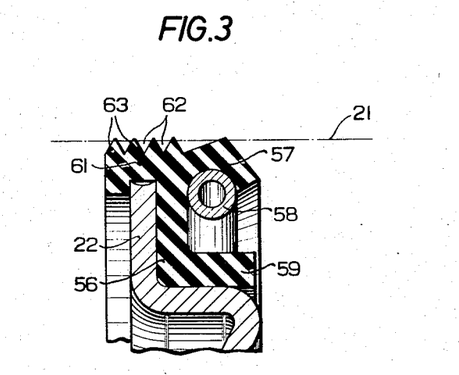
FIG. 3 is a fragmentary sectional view on an enlarged scale of a sealing structure of the invention.

The structure of the sealing ring 56 is most clearly shown in FIG. 3. As may be seen from FIG. 3 this sealing ring 56, made of any suitable rubber, compressible plastic, or the like, has an outer lip portion 57 which extends from the piston 22 into the pressure chamber 24, and, as is well known, an endless spring 58 can be placed against the lip 57 to urge the latter outwardly against the inner cylindrical surface of the housing 21. The sealing ring 56 includes a second, inner cylindrical extension 59 which surrounds and presses against a cylindrical portion of the piston 22 for causing the sealing ring 56 to grip and thus remain assembled with the piston 22. In addition the sealing ring 56 has an outer cylindrical portion 61 which fluid-tightly and slidably engages the inner cylindrical surface of the housing 21, and this portion 61 has the same diameter as the spring-pressed lip 57, this outer diameter of the sealing ring being, when the sealing ring is not situated in the housing 21, greater than the inner diameter of the housing 21. The relationship which the inner surface of the housing 21 has with respect to the sealing ring 56 when the latter is unstressed is indicated by the dot-dash line at the upper part of FIG. 3, so that when the sealing ring 56 is situated within the housing 21, the sealing ring will be compressed so as to provide a good fluid-tight seal. The exterior of the sealing ring 56 is formed at its portion 61 with a plurality of circular grooves 62 which may be cut into the sealing ring or ground in the latter, and these grooves define between themselves the teeth 63 which preferably are of a triangular cross section, as illustrated. However, it is also possible to provide the grooves 62 with a rounded cross sectional configuration. These grooves can in a known way receive a lubricating medium. The tips of the circular teeth 63 press, after assembly of the sleeve 56 with the interior of the housing 21 against the inner surface thereof so as to fluid-tightly and slidably engage this inner surface, and the difference between the unstressed outer diameter of the sealing ring 56 and the inner diameter of the housing 21 is so small that the sharp edges of the teeth 63 are blunted but the teeth 63 do not tilt in one direction or the other and remain directed outwardly in a radial direction. Thus, the teeth 63 will maintain the configuration shown in FIG. 3 except that the tips of the teeth are compressed so that the sealing ring 56 when in the housing 21 has at its teeth 63 a somewhat truncated triangular cross-sectional configuration.

The piston 22 has an outer cylindrical portion 22c which is directly engaged by the inner lip 59 of the sealing ring 56, and this cylindrical portion 22c surrounds an inner cylindrical portion 22d of the piston 22, these cylindrical portions being interconnected by a frustoconical portion 65 of the piston 22. The right end wall of the housing 21 has a mating frustoconical surface portion 66 which engages and lies flush against the frustoconical portion 65 of the piston 22 when the latter is in its brake-releasing position. As may be seen from FIG. 2, the annular surface portion 67 of the inner surface 66 of the right end wall of the housing 21 is of a frustoconical configuration which mates with and engages the frustoconical portion 65 of the piston 22, and in this way when the piston 22 is in its rest position where the brakes are released the piston 22 is maintained in the housing 21 in a vibration-proof manner.

An inner central portion of the piston 22 forms part of the operator-actuated valve means 52, and for this purpose the inner portion of the piston 22 is formed with an aperture and provides a valve seat 68 of the valve means 52. It is to be noted that this axially extending valve seat portion 68 of the piston 22 extends into the hollow end portion of the piston rod 37. The hollow end portion 51 of the piston 37 which forms a valve housing, as referred to above, also accommodates in its interior a valve spring 69 which presses against a valve member 70 so as to urge the latter toward and into engagement with the valve seat 68.

The operator-actuated valve means also includes a second valve seat portion 71 situated at the left end of an elongated member 72, as viewed in FIG. 2, which has a piston portion slidably and fluid-tightly engaging the inner cylindrical surface of the second valve housing 55, and this member 72 is adapted to be axially moved by the operator in response to operation of the foot-lever 13. For this purpose the lever 13 is operatively connected with a plunger 73 which extends into an axial bore of the adjusting member 72 in the manner indicated in FIG. 2, the connection being through a suitable spring which surrounds the left end portion of the plunger 73, with its left end engages an enlarged head end of the plunger 73, and with its right end engages a split ring situated in a groove which communicates with the bore of the member 72 which receives the plunger 73, so that in this way when the plunger 73 moves to the left it will directly press against the member 72 for advancing the latter to the left, as viewed in FIG. 2, while when the plunger 73 moves to the right it will act through the spring on the member 72 for shifting the latter to the right, and any suitable unillustrated spring acts on the lever 13 for urging the latter to turn in a clockwise direction, as viewed in FIG. 1, so as to withdraw the adjusting member 72 to the right, as viewed in FIG. 2, to its rest position. The piston portion 74 of the adjusting member 72 defines a working chamber 75 in the interior of the valve housing 55, and this piston portion 74 is surrounded and engaged by a sealing ring 76 which slidably and fluid-tightly engages the inner cylindrical surface of the valve housing 55. As will be apparent from the description which follows, the adjusting member 72 acts as a control for applying or retracting the brakes.

From its left end portion 71, which acts as a second valve seat, the adjusting member 72 is formed with an axial bore 77 which at its right end communicates with a transverse bore 77' situated to the right of the sealing ring 76 and passes completely through the member 72 so as to communicate with the exterior surface thereof. In the region of the transverse bore 77' the valve housing 55 is formed with a radial opening 78 which communicates through the transverse bore 77' with the axial bore 77, and this opening 78 also communicates with an axial bore 79 which is formed in the valve housing 55 and which communicates with an opening passing through the wall of the piston 22 and communicating with a radial groove 80 formed in the right surface of the flange 53 of the piston 37, and this groove 80 opens into the atmospheric chamber 23 referred to above, so that the groove 80 as well as the bore 79 and of course the opening 78 as well as the transverse bore 77' and axial bore 77 are always at atmospheric pressure. A portion 81 of the working chamber 75 accommodates a coil spring 82 which engages a part of the piston 22 and the piston 74 for urging the latter together with the rest of the adjusting member 72 to the right, as viewed in FIG. 2, so as to retract the valve seat 71 away from the valve member 70 which cooperates with the valve seat 71 as well as with the valve seat 68. The wall of the valve housing 55 is formed with an inclined bore 83 passing therethrough and providing communication between the pressure chamber 24 and the working chamber 75. The valve housing 55 has a cylindrical extension 84, formed integrally therewith, for example, and this extension 84 extends through a fluid-tightly sealed portion of the housing 21 to the exterior of the latter. The adjusting member 72 as well as the extension 84 are covered by a dust-tight bellows 85 through which only part of the plunger 73 projects, so that in this way dust, dirt, or other foreign particles cannot have access into the interior of the structure shown in FIG. 2.

The above-described structure operates in the following manner:

The brake installation illustrated and described above is designed for a vehicle which because of its relatively great weight requires a strong braking action. The compressor 1 supplies compressed air into the source 4. The pressure regulator 3 is set to provide a relatively high pressure on the order of approximately 13–16 atmospheres, so that the source 4 must be a strong high-pressure tank. Through the conduit 5 the compressed air at this relatively high pressure reaches the interior of the pressure chamber 26 through the non-return valve means 29, and thus the pressure-responsive means 31 is moved by the fluid under pressure in the chamber 26 to the right, as viewed in FIG. 2, so as to compress the spring 33 and maintain it compressed as long as the pressure in the chamber 26 remains above a given value, and the movement of the pressure-responsive piston 31 continues until it engages the central portion 35 of the transverse wall 34 which is common to both of the housing means, as pointed out above. The piston rod 37 and the piston 22 which form the fluid-pressure means are under the pressure of the return springs of the main hydraulic brake means 10, although if desired a braking linkage can be operated from the main brake means 10 to act on the piston rod 37 to retain the latter and the piston 22 in their illustrated rest positions when the brakes are released.

The high pressure fluid passes from the pressure chamber 26 of the spring-pressure housing means 8 through the transverse bore 49 and along the axial bore 50 of the piston rod 37 into the hollow valve housing portion 51 formed at the right end of the piston rod 37, and thus the hollow piston rod itself forms part of the conduit means, as pointed out above. Within the valve housing 51 the valve member 70 is situated on the valve seat 68, as a result of the spring 69, and thus at this time the high pressure fluid cannot have access to the pressure chamber 24. By situating the valve structure 68, 70 directly in the hollow end portion 51 of the piston rod 37 it is possible to eliminate conventional conduit structure of known braking assemblies.

Assuming now that the operator acts on the lever 13 to apply the brakes, then of course the plunger 73 will advance the adjusting member 72 in opposition to the spring 82 to the left, as viewed in FIG. 2, until the second valve seat 71 engages the valve member 70, the end of the member 72 which is provided with the valve seat 71 having a reduced diameter and the opening at the center of the piston 22 being large enough to provide for free passage of the valve seat portion 71 into this opening into engagement with the valve member 70. Thus, the valve member 70 will now engage the valve seat 71 so as to prevent communication between the bore 83 and the outer atmosphere, and thus the working chamber 75 cannot at this time communicate with the outer atmosphere through the bore 77, the transverse bore 77', the opening 78, the axial bore 79, and the radial groove 80 which opens into the atmospheric chamber 23, as pointed out above. Further depression of the lever 13 by the operator will result in displacement of the valve member 70 by the adjusting member 72 in opposition to the spring 69 from the valve seat 68, and thus the valve 68, 70 is opened, while the valve 70, 71 is closed, and the high pressure fluid can now flow from the pressure chamber 26 of the spring-pressure housing means 8 past the valve member 70 into the working chamber 75 and from the latter through the inclined bore 83 into the pressure chamber 24 of the fluid-pressure housing means 7. The piston 22 therefore advances to the left, as viewed in FIG. 2, and the high pressure air which is derived in this way from the pressure chamber 26 is constantly replaced by the source 4 through the conduit 5 and the non-return valve 29. The pressure of the compressed air is maintained at its high value by the excellent seal provided by the sealing ring 56 through its lips 57 and 61, as pointed out above. The piston 22 of course advances the piston rod 37 to the left, and the entire valve housing 55 participates in this movement, as well as the valves 68, 70 and 70, 71. Thus, the adjusting member 72 in cooperation with this valving structure acts as a follow-up control valve assembly and provides the operator with a "feel" of the braking action, this "feel" being transmitted through the adjusting member 72 and the plunger 73 to the lever 13 which is engaged by the foot of the operator. The piston 22 will advance to the left as long as the operator maintains the valve member 70 raised away from the valve seat 68, but as soon as the piston 22 reaches with its valve seat 68 the valve member 70, the operator will feel less pressure and if the brakes are applied too strongly he need only release the lever 13 somewhat whereupon the member 72 will advance to the right immediately placing the pressure chamber 24 in communication with the outer atmosphere, so that in this way a very sensitive and effective follow-up control for the piston 22 and the piston rod 37 is provided. During these operations the pressure-responsive means 31 remains in its position shown in FIG. 2 because the pressure of the fluid in the chamber 26 remains undiminished. The plunger 44 is advanced by the piston rod 37 into the main cylinder 10 so as to actuate the pistons therein, these pistons also being shifted to the left, as viewed in FIG. 2, so that in this way the hydraulic fluid is transmitted along the lines 17 and 19 to the wheel-braking assemblies 18 and 20 which thus press the brakes against the brake drums, as is well known in the art.

To release the brakes the operator need only release the pedal 13. Now the spring 69 will advance the valve member 70 onto the valve seat 68 so as to close the valve 68, 70 while the valve 70, 71 immediately opens, and the fluid under pressure in the chamber 24 as well as in the working chamber 75 can discharge to the outer atmosphere through the atmospheric chamber 23 in the manner pointed out above. In this way the piston 22 is returned to its initial position, the springs which act on the pistons in the main cylinder 10 serving to act through the plunger 44 on the piston rod 37 to return the latter together with the piston 22 into their initial position shown in FIG. 2 because the chamber 24 is now again at atmospheric pressure. In its rest position the piston 22 is maintained by the portion 67 of the housing 21 in a vibration-proof manner, as pointed out above. Thus, the fluid-pressure housing 7 forms part of a single-chamber structure for transmitting the controls from the pedal 13 to the brake means 10 with a power-braking assembly which greatly amplifies the force which the operator actually applies to the lever 13.

A braking assembly of the above type which operates with a high pressure so as to produce a strong and very effective braking action would have the disadvantage that if the high pressure fluid system should fail the operation of the vehicle in traffic will be exceedingly dangerous unless in such case the spring-pressure means 33 is not available for applying its force to actuate the brake means 10. Thus, the operator of the vehicle can easily sense by the "feel" of the pedal 13 that the brakes are not operating, because when the high pressure fluid system fails the brakes can be applied with only a fraction of the force with which they are applied when the high pressure fluid system is operating properly. If, however, the pressure of the fluid in the container 4 or in the conduit 5 falls substantially for any reason such as a leak in the conduit 5, for example, then with the structure of the invention the non-return valve 29 immediately operates to prevent any of the high pressure fluid from escaping out of the pressure chamber 26 because the pressure in the latter at this time is greater than the pressure in the conduit 5, and thus the automatic closing of the valve 29 at this time will retain the high pressure air in the pressure chamber 26 of the spring-pressure housing means 8.

It is to be noted that the unitary assembly 9 is constructed in such a way that when the brakes are released the pressure chamber 26 has a much larger volume than the pressure chamber 24. Therefore, because of this much larger volume of the pressure chamber 26, there is available an additional amount of high pressure fluid to continue the operation of the brakes with the fluid-pressure means 22, 37 even though no more pressure fluid can be delivered to the chamber 26 through the valve 29. Thus, with an economical use of the high pressure air which is available in the chamber 26 after failure of the supply of additional compressed air thereto, it is still possible for the operator to carry out a few braking actions with the fluid-pressure brake means 22, 37 in the usual way.

Moreover, it is quite likely that the operator of the vehicle by consulting a pressure gauge on the dash of the vehicle will note the sudden drop in pressure which has taken place as a result of any sudden leak in the line 5 or failure in the tank 4, for example, so that once the operator notes the drop in pressure he will operate the pedal 13 very carefully so as to conserve the available compressed air in the chamber 26 for the purpose of bringing the vehicle to a safe stop.

If, however, after a few careful actuations of the brake means under the above circumstances the pressure in the chamber 26 falls below 7 atmospheres, approximately, in the above example of a high pressure system, then the pressure-responsive piston 31 responds and the spring 33 expands automatically and advances the piston 31 to the left, as viewed in FIG. 2. After an extremely short movement to the left the inner portion of the piston 31 engages the nut 47 and through this nut transmits its movement to the piston rod 37 so as to apply the brakes through this actuation of the brake means 10 at this time by the spring-pressure means 33. It is to be noted that since the spring 33 expands while the pressure in the chamber 26 is slightly below 7 atmospheres, this spring 33 cannot have a sudden expansion and cannot apply the brakes in a very sudden jerky manner. With the structure of the invention the brakes are gradually applied when the spring 33 operates automatically in the manner described above. At this time the operator can with a slight pressure on the lever 13 open the valve 68, 70 and then close it through several slight actuations of the lever 13 in order to permit the compressed air remaining in the chamber 26 to gradually escape therefrom to the outer atmosphere, and thus, the final full application of the brakes by the spring 33 is controlled by the manner in which the operator actuates the pedal 13. During this period it is possible to apply the brakes with force derived both from the fluid-pressure means and from the spring-pressure means and even when there is no more compressed air available in the chamber 26 it is still possible for the operator to have some control of the brakes because the force with which the operator depresses the pedal 13 at this time will increase the braking force inasmuch as the braking force will now be transmitted by the operator directly to the piston rod 37.

Assuming now that the spring means 33 is acting to apply the brakes of the vehicle so that these brakes are retarding the movement of the vehicle or even that the vehicle has already come to a stop and that the situation is such that the operator must cause the vehicle to travel still further through a short distance, for example, then all that the operator need do is pull on the hand grip 14 so as to act through the rod 15 on the lever 16 to turn the latter in a clockwise direction, as viewed in FIG. 2, and this will result in the free end of the lever 54 engaging the flange 53 of the piston rod 37 so that the operator can manually retract the piston rod 37 in order to manually compress the spring 33 and release the force of the brakes. The lever 54 normally remains against the wall 34 and does not participate in the operation. However, when the brakes are applied by the spring 33 the flange 53 is located adjacent to the lever 54 in the path of turning thereof, and because of the very great mechanical advantage which is provided by the long lever 16 it is not very difficult for the operator to compress the spring 33 so as to release the brakes whenever desired. Of course, when the operator releases his pull on the hand grip 14 the spring 33 will again expand to apply the brakes.

It is of course within the scope of the invention to provide an arrangement where the hydraulic main cylinder 10 operates only on part of the brakes of the vehicle, or even to replace the hydraulic braking means 10 with a mechanical linkage which acts directly on the wheel brakes 18 and 20.

It will be understood that each of the elements described above, or two or more together, may also find a useful application in other types of braking assemblies differing from the types described above.

While the invention has been illustrated and described as embodied in vehicle brake installations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a system for actuating the brake means of a vehicle, in combination, a pair of housings connected to each other to form a unitary assembly; spring-pressure means and fluid-pressure means respectively situated in said housings and adapted to actuate said brake means to brake the vehicle; a source of pressure fluid; conduit means placing said source of pressure fluid in communication with both of said housings; non-return valve means controlling the flow of fluid to the housing which contains said spring-pressure means to prevent fluid in the latter housing from flowing back toward said source when the pressure of the fluid in said housing is greater then the pressure of the fluid before the latter passes through said non-return valve means to said latter housing; operator-actuated valve means controlling the flow of pressure fluid into the housing which contains said fluid-pressure means; and means in said housing which contains said spring-pressure means for maintaining the latter inoperative when the pressure of the fluid in said latter housing is above a predetermined value and for responding automatically to a drop in the pressure of the fluid in said latter housing below said predetermined value to render said spring-pressure means operative to actuate said brake means.

2. In a system for actuating the brake means of vehicles, in combination, a fluid-pressure housing and a spring-pressure housing connected to each other to form a unitary assembly; fluid-pressure means located in said fluid-pressure housing and adapted to actuate said brake means to brake the vehicle; spring-pressure means in said spring pressure housing also adapted to actuate said brake means to brake the vehicle; a source of pressure fluid; conduit means communicating with said source and with said spring pressure housing to deliver fluid under pressure from said source to said spring pressure housing; non-return valve means operatively connected to said conduit means for preventing fluid under pressure from flowing from said spring-pressure housing toward said source when the pressure of the fluid in said spring-pressure housing is greater than the fluid upstream of said non-return valve means; pressure-responsive means situated in said spring-pressure housing for maintaining said spring-pressure means inoperative to actuate said brake means as long as the fluid pressure in said spring-pressure housing is above a predetermined value, said pressure responsive means responding to a drop in the pressure of the fluid in said spring pressure housing below said predetermined value to release said spring pressure means for actuating said brake means; second conduit means leading from said spring-pressure housing to said fluid-pressure housing and communicating with the fluid under pressure in said spring-pressure housing; and operator-actuated valve means operatively connected with said second conduit means for controlling the flow of pressure fluid from said spring-pressure housing into said fluid pressure housing for actuating said fluid-pressure means therein.

3. In a system as recited in claim 2, said fluid-pressure means including an elongated piston rod which extends into said spring-pressure housing and said piston rod having a hollow interior communicating with the interior of said spring-pressure housing and forming said second conduit means, said operator-actuated valve means being situated in the hollow interior of said piston rod.

4. In a system for actuating the brake means of vehicles, in combination, fluid-pressure housing means and spring-pressure housing means coaxially arranged with respect to each other and connected to each other to form a unitary assembly; fluid-pressure means in said fluid-pressure housing means adapted to cooperate with said brake means for actuating the latter; spring-pressure means in said spring-pressure housing means also adapted to coact with said brake means for actuating the latter; a source of pressure fluid; conduit means placing said source in communication with both of said housing means; non-return valve means controlling the flow of pressure fluid to said spring-pressure housing means; operator-actuated valve means in said unitary assembly for controlling the flow of pressure fluid to said fluid-pressure housing means; and pressure-responsive means in said spring-pressure housing means for rendering said spring-pressure means operative to actuate said brake means only when the pressure of the fluid in said spring-pressure housing means falls below a predetermined value.

5. In a system as recited in claim 4, each of said housing means having a pressure chamber for containing fluid under pressure and an atmospheric chamber communicating with the outer atmosphere, said atmospheric chambers of both of said housing means being situated next to each other and said pressure chambers of said housing means being situated distant from each other with said atmospheric chambers being situated between said pressure chambers.

6. In a system for actuating the brake means of vehicles, in combination, combined housing means including fluid-pressure housing means and spring-pressure housing means coaxially fixed with each other to form a unitary assembly, both of said housing means having a common wall situated between said fluid-pressure and spring-pressure housing means; fluid-pressure means situated in said fluid-pressure housing means adapted to actuate said brake means; spring means in said spring-pressure housing means also adapted to actuate said brake means; a source of pressure fluid; conduit means placing said source in communication with both of said housing means; operator-actuated valve means located in said combined housing means and coacting with said conduit means for controlling the flow of fluid from said source to said fluid-pressure housing means for actuating said fluid-pressure means therein; a piston slidable in said spring-pressure housing means and defining therein a pressure chamber situated on the side of said piston opposed from said common wall and communicating with said source; non-return valve means controlling the flow of fluid pressure from said source into said pressure chamber, said spring means being situated between said piston and said common wall and said piston responding to the pressure in said pressure chamber for maintaining said spring means compressed and inactive, said common wall limiting the movement of said piston toward said common wall for determining the maximum size of said pressure chamber, and said piston forming a pressure-responsive means which responds to a drop in the pressure of fluid in said pressure chamber for releasing said spring means to expand and actuate said brake means.

7. In a system as recited in claim 6, said spring-pressure housing means having an end wall distant from said common wall and defining part of said pressure chamber, said end wall carrying an insert which extends into said chamber and which is located in the path of movement of said piston away from said common wall to limit the movement of said piston away from said common wall.

8. In a system for actuating the hydraulic brake means of vehicles, in combination, fluid-pressure housing means having an end wall; a substantially cup-shaped sheet-metal housing having an open end fixed to said end wall of said fluid-pressure housing means to define therewith a spring-pressure housing means, said spring-pressure housing means having an end distant from said end wall for supporting a portion of said hydraulic brake means; fluid-pressure means in said fluid-pressure housing means adapted to actuate said brake means; spring means in said spring-pressure housing means also adapted to actuate said brake means; a source of pressure fluid; conduit means for providing communication between said source and the interiors of said fluid-pressure housing means and spring-pressure housing means; non-return valve means controlling the flow of fluid through said conduit means into said spring pressure housing means; operator-actuating valve means in said fluid pressure housing means for controlling the flow of pressure fluid through said conduit means into said fluid-pressure housing means; and means in said spring-pressure housing means responding to drop in the pressure of the fluid therein for rendering said spring means operative to actuate said brake means.

9. In a system as recited in claim 8, said spring-pressure housing means carrying an insert at said end thereof which carries said hydraulic brake means for reinforcing said end of said spring-pressure housing means.

10. In a system for actuating the brake means of a vehicle, in combination, fluid-pressure housing means; spring-pressure housing means coaxially fixed to said fluid-pressure housing means and forming therewith a unitary assembly; piston rod means common to both of said housing means and adapted to cooperate with said brake means for actuating the latter; fluid-pressure means in said fluid-pressure housing means operatively connected to said piston rod means for moving the latter to actuate said brake means; spring-pressure means in said spring-pressure housing means also operatively connected to said piston rod means for actuating the latter to actuate said brake means; a source of fluid-pressure; conduit means providing communication between said source and both of said housing means; non-return valve means connected with said conduit means for controlling the flow of fluid therethrough into said spring-pressure housing means; operator-actuated valve means in said unitary assembly operatively connected with said conduit means and controlling the flow of fluid therethrough into said fluid-pressure housing means; and means in said spring-pressure housing means for responding to a drop in the pressure of the fluid therein for rendering said spring-pressure means operative to actuate said piston rod means.

11. In a system as recited in claim 10, an insert carried by said spring-pressure housing means; and fluid-tight means carried by said insert and surrounding and engaging said piston rod means for fluid-tightly guiding the latter for axial movement.

12. In a braking installation for a vehicle, in combination, a housing having opposed ends; spring means engaging one of said ends; a piston slidable in said housing and dividing the latter into a pair of chambers one of which is distant from the end of said housing engaged by said spring means, said piston having a cylindrical hollow portion surrounded by said spring means; a source of fluid-pressure; conduit means providing communication between said source and said one chamber; non-return valve means operatively connected to said conduit means for controlling the flow of fluid therethrough into said chamber, the pressure of the fluid into said chamber acting through said piston on said spring means to maintain the latter compressed; a cylindrical insert carried by the other of said ends of said housing and received in said hollow cylindrical interior of said piston during expansion of said spring means, said insert being formed with a cutout through which fluid pressure can freely flow to the interior of said hollow portion of said piston; and means actuated by said piston during movement thereof by said spring means upon a drop in the pressure of the fluid in said chamber for actuating a brake means of the vehicle.

13. In an installation as recited in claim 12, said means actuated by said piston including an elongated piston rod with respect to which said piston is freely movable, and a nut fitted on said piston rod and located in the path of movement of said piston for adjusting the cooperation between said piston and piston rod.

14. In a braking installation for vehicles, in combination, a cylinder; a piston slidable in said cylinder and dividing the latter into a pressure chamber situated on one side of said piston and an atmospheric chamber situated on the other side of said piston and communicating with the outer atmosphere; a piston rod fixed to said piston for movement therewith and adapted to actuate a brake means upon movement of said piston from a given rest position where said pressure chamber has a minimum volume; a source of pressure fluid; conduit means communicating with said source and with said pressure chamber for delivering pressure fluid thereto; operator-actuated valve means located in said cylinder and cooperating with said conduit means for controlling the flow of pressure fluid into said pressure chamber, so that when pressure fluid flows thereto said piston will move in said cylinder to move said piston rod for actuating said brake means, said piston rod having a flanged portion situated in said atmospheric chamber; and manually operable lever means carried by said cylinder and having a free end situated in said atmospheric chamber and turnable along the path intersecting the path of movement of said flanged portion of said piston, so that at least when said piston is in a certain range of positions actuation of said lever means by the operator will displace said free end of said lever means into engagement with said flanged portion of said piston rod to move the latter and said piston therewith.

15. In a braking installation for vehicles, in combination, elongated tubular means carrying in its interior a transverse wall dividing said tubular means into a pair of cylinders, said transverse wall being formed with a central opening passing therethrough; piston means slidable in one of said cylinders and including a piston rod extending through said opening of said transverse wall into the other of said cylinders; a second piston slidable in said other cylinder and formed with a central aperture through which said piston rod also extends; a coil spring situated between and engaging said second piston and said transverse wall, so that when fluid pressure is applied to said second piston to urge the latter toward said transverse wall said spring will be compressed between said second piston and said transverse wall; means for transmitting motion of said second piston to said piston rod when said spring expands upon a drop in the pressure of the fluid acting on said second piston, said piston rod being adapted to actuate a brake means during longitudinal movement thereof for braking the vehicle; and manually operable lever means carried by said tubular means and extending into said one cylinder for engaging said piston means therein to act on the latter to retract said piston rod in opposition to said spring.

16. In a system for actuating the brake means of a vehicle, in combination, fluid-pressure housing means and spring-pressure housing means connected to said fluid-pressure housing means to form a unitary assembly therewith; fluid-pressure means in said fluid-pressure housing means adapted to actuate said brake means; spring-pressure means in said spring-pressure housing means also adapted to actuate said brake means; a source of fluid under pressure; conduit means providing communication between said source and both of said housing means to supply fluid under pressure thereto; means responding to a drop in pressure of fluid in said spring-pressure housing means for rendering said spring-pressure means operative to actuate said brake means; and operator-actuated valve means in said fluid-pressure housing means for controlling the flow of fluid into the latter from said conduit means, said fluid-pressure means including a piston part of which forms part of said operator-actuated valve means.

17. In a system as recited in claim 16, said fluid pressure means including in addition to said piston an elongated hollow piston rod having a hollow end portion situated adjacent said piston on one side thereof and forming a valve housing, said operator-actuated valve means including a second, cylindrical valve housing situated on the other side of said piston coaxially therewith, said piston having an inner portion surrounded by said hollow end portion of said piston rod and formed with an opening passing therethrough, said inner portion of said piston forming a valve seat, a pair of sealing means engaging opposite sides of said piston and situated between the latter and said piston rod, on the one hand, and said second valve housing, on the other hand, means fixing said piston rod, said piston, and said valve housing to each other with said pair of sealing means situated therebetween, and a second piston slidable in said second valve housing and forming part of said operator-actuated valve means.

18. In a system as recited in claim 17, said inner portion of said first-mentioned piston forming a valve seat, and said operator-actuated valve means including a spring-pressed valve member in said hollow end portion of said piston rod, said hollow piston rod forming part of said conduit means for delivering fluid under pressure to the side of said first-mentioned piston which is situated opposite from said piston rod, whereby when said valve member engages said valve seat fluid under pressure cannot flow to said opposite side of said first-mentioned piston, said second piston being shiftable in said cylindrical second valve housing by the operator and having an elongated piston rod portion for engaging said valve member and displacing the latter from said valve seat to admit fluid under pressure to said opposite side of said piston, said piston rod portion of said second piston being formed with a bore communicating with a side of said second piston opposed to that side thereof which is directed toward said inner portion of said first-mentioned piston, and said second valve housing being formed with a bore communicating with said bore of said piston rod portion of said second piston and with the side of said first-mentioned piston where said piston rod is located, said latter side of said first-mentioned piston communicating with the outer atmosphere, so that when said second piston is displaced away from said valve member the latter closes the passage to said opposite side of said first-mentioned piston and fluid pressure at said opposite side of said first-mentioned piston can escape to the outer atmosphere.

19. In a system as recited in claim 18, said second valve housing being formed with at least one inclined bore passing therethrough to provide flow of pressure fluid over the entire side of said first-mentioned piston which is opposite from said first-mentioned piston rod.

20. In a system for actuating the brake means of vehicles, in combination, fluid-pressure housing means and spring-pressure housing means connected to said fluid-pressure housing means to form a unitary structure therewith; spring-pressure means in said spring-pressure housing adapted to actuate said brake means; fluid-pressure means in said fluid-pressure housing means also adapted to actuate said brake means; a source of fluid under pressure; conduit means providing communication between said source and both of said housing means; means in said spring-pressure housing means responding to a drop of fluid pressure therein to render said spring-pressure means active for actuating said brake means; operator-actuated valve means in said unitary structure for admitting fluid under pressure from said conduit means into said fluid-pressure housing means for actuating said fluid-pressure means therein, said fluid-pressure means including a piston having a frustoconical portion and said fluid-pressure housing means having an end wall engaged by said piston when said brake means is released and having a mating frustoconical portion extending into said frustoconical portion of said piston to support the latter in a vibration-proof manner when the brake means is released.

21. In a system for actuating the brake means of vehicles, in combination, fluid-pressure housing means and spring-pressure housing means connected to each other and forming a unitary assembly; fluid-pressure means in said fluid-pressure housing means adapted to actuate said brake means; spring-pressure means in said spring-pressure housing means also adapted to actuate said brake means; a source of fluid under pressure; conduit means communicating with said source and built of said housing means for supplying fluid under pressure thereto; operator-actuated valve means in said unitary assembly providing communication between said conduit means and said fluid-pressure housing means to admit fluid pressure into the latter; and means in said spring-pressure housing means responding to a drop of fluid-pressure therein for rendering said spring means operative to actuate said brake means; and non-return valve means controlling the flow of fluid from said conduit means into said spring-pressure housing means, said non-return valve means being directly carried by and attached to said spring-pressure housing means.

22. In a system for actuating the brake means of vehicles, in combination, fluid-pressure housing means; spring-pressure housing means fixed to said fluid-pressure housing means and forming a unitary assembly therewith; fluid-pressure means in said fluid-pressure housing means adapted to actuate said brake means, said fluid-pressure housing means defining with said fluid-pressure means a pressure chamber which has a minimum volume when said brake means is released; spring-pressure means in said spring-pressure housing means also adapted to actuate said brake means; a source of pressure fluid; conduit means communicating with said source in both of said housing means for supplying fluid under pressure thereto; and pressure responsive means in said spring-pressure housing means acting on said spring-pressure means to maintain the latter inoperative until the pressure of the fluid in said spring-pressure housing means falls below a given value, said pressure responsive means defining with said spring-pressure housing means a pressure chamber which as long as the pressure in said spring-pressure housing means is above said value has a volume substantially greater than said minimum volume of said pressure chamber of said fluid-pressure housing means; and non-return valve means for preventing fluid in said spring-pressure housing means from flowing out of the latter back to said source, both of said pressure chambers communicating with each other so that if for any reason the pressure from said source drops said fluid-pressure means can still be actuated at least in part from the fluid under pressure in said spring-pressure housing means.

23. In a system for actuating the brake means of a vehicle, in combination, fluid-pressure housing means and spring-pressure housing means fixed thereto and forming a unitary assembly, said fluid-pressure housing means having a cylindrical configuration; fluid-pressure means in said fluid-pressure housing means, said fluid-pressure means including a piston adapted to actuate said brake means and a sealing ring surrounded and carried by said piston and engaging an inner surface of said cylindrical fluid-pressure housing means, said piston having a high pressure side and a low pressure side and said sealing ring having an elongated cylindrical portion extending from said piston into said high pressure side of said fluid-pressure housing means and fluid-tightly pressing against said inner surface thereof, said sealing ring also having a portion surrounding the outer periphery of said piston and extending therefrom into said low pressure side of said fluid-pressure housing means; spring-pressure means situated in said spring-pressure housing means also adapted to actuate said brake means; a source of fluid under pressure; conduit means providing communication between said source and both of said housing means; and means in said spring-pressure housing means responding to a drop in the pressure of the fluid therein for rendering said spring-pressure means operative to actuate said brake means.

24. In a system as recited in claim 23, said sealing ring being formed at its exterior with annular grooves defining between themselves teeth which engage the inner surface of said fluid-pressure housing means.

25. In a system as recited in claim 24, said teeth having a triangular cross-sectional configuration.

References Cited by the Examiner

UNITED STATES PATENTS

| | | | |
|---|---|---|---|
| 3,076,441 | 2/1963 | Ayers | 91—434 |
| 3,101,219 | 8/1963 | Herrera | 92—63 |
| 3,112,959 | 12/1963 | Kateley | 91—170 |
| 3,127,818 | 4/1964 | Cruse | 92—110 |
| 3,182,566 | 5/1965 | Berg et al. | 92—63 |
| 3,217,611 | 11/1965 | Leighten | 92—63 |
| 3,218,939 | 11/1965 | Cruse | 92—63 |

EDGAR W. GEOGHEGAN, *Primary Examiner.*

PAUL E. MASLOUSKY, *Examiner.*